United States Patent
Chen

(10) Patent No.: US 7,616,712 B2
(45) Date of Patent: *Nov. 10, 2009

(54) SYSTEMS AND METHODS FOR DETECTING DISCONTINUOUS TRANSMISSION (DTX) USING CYCLIC REDUNDANCY CHECK RESULTS TO MODIFY PRELIMINARY DTX CLASSIFICATION

(75) Inventor: Dayong Chen, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 613 days.

This patent is subject to a terminal disclaimer.

(21) Appl. No.: 11/381,040

(22) Filed: May 1, 2006

(65) Prior Publication Data

US 2006/0187888 A1    Aug. 24, 2006

Related U.S. Application Data

(63) Continuation of application No. 10/075,008, filed on Feb. 13, 2002, now Pat. No. 7,061,999.

(51) Int. Cl.
*H04L 27/06* (2006.01)
(52) U.S. Cl. .................................................. 375/340
(58) Field of Classification Search ................ 375/262, 375/340–343; 370/332–333, 318, 350; 714/758, 714/774, 786, 795
See application file for complete search history.

(56) References Cited

U.S. PATENT DOCUMENTS

| | | | |
|---|---|---|---|
| 5,881,105 A | 3/1999 | Balachandran et al. | |
| 5,936,979 A | 8/1999 | Jyrkkä | |
| 6,038,238 A | 3/2000 | Jokinen et al. | |
| 6,092,230 A | 7/2000 | Wood et al. | |
| 6,097,772 A | 8/2000 | Johnson et al. | |
| 6,370,392 B1* | 4/2002 | Li et al. | 455/522 |
| 6,510,409 B1 | 1/2003 | Su | |
| 6,587,447 B1 | 7/2003 | Wang et al. | |
| 6,731,606 B2 | 5/2004 | Lin et al. | |
| 6,775,521 B1 | 8/2004 | Chen | |
| 6,801,510 B2* | 10/2004 | DiFazio et al. | 370/328 |
| 6,990,093 B1* | 1/2006 | Rantalainen et al. | 370/350 |
| 7,180,881 B2* | 2/2007 | DiFazio | 370/335 |
| 2003/0095507 A1 | 5/2003 | Chen et al. | |
| 2003/0142632 A1* | 7/2003 | Lin et al. | 370/252 |

* cited by examiner

*Primary Examiner*—Khanh C Tran
(74) *Attorney, Agent, or Firm*—Myers Bigel Sibley & Sajovec, P.A.

(57) ABSTRACT

A received information signal is decoded to obtain the received information and to produce at least one feature of the received information signal. The received information signal is preliminarily classified as containing a normal burst or a truncated burst based upon the at least one feature, to obtain a preliminary classification. Cyclic redundancy checking of the received information that is decoded is performed. The received information signal is then further classified as containing a normal burst or a truncated burst based upon the preliminary classification and whether the cyclic redundancy checking is valid, to obtain a further classification. The received information signal may be still further classified as containing a normal burst or a truncated burst based upon the further classification and at least one transition rule for normal bursts and truncated bursts between the received information signal and a previously received information signal.

24 Claims, 4 Drawing Sheets

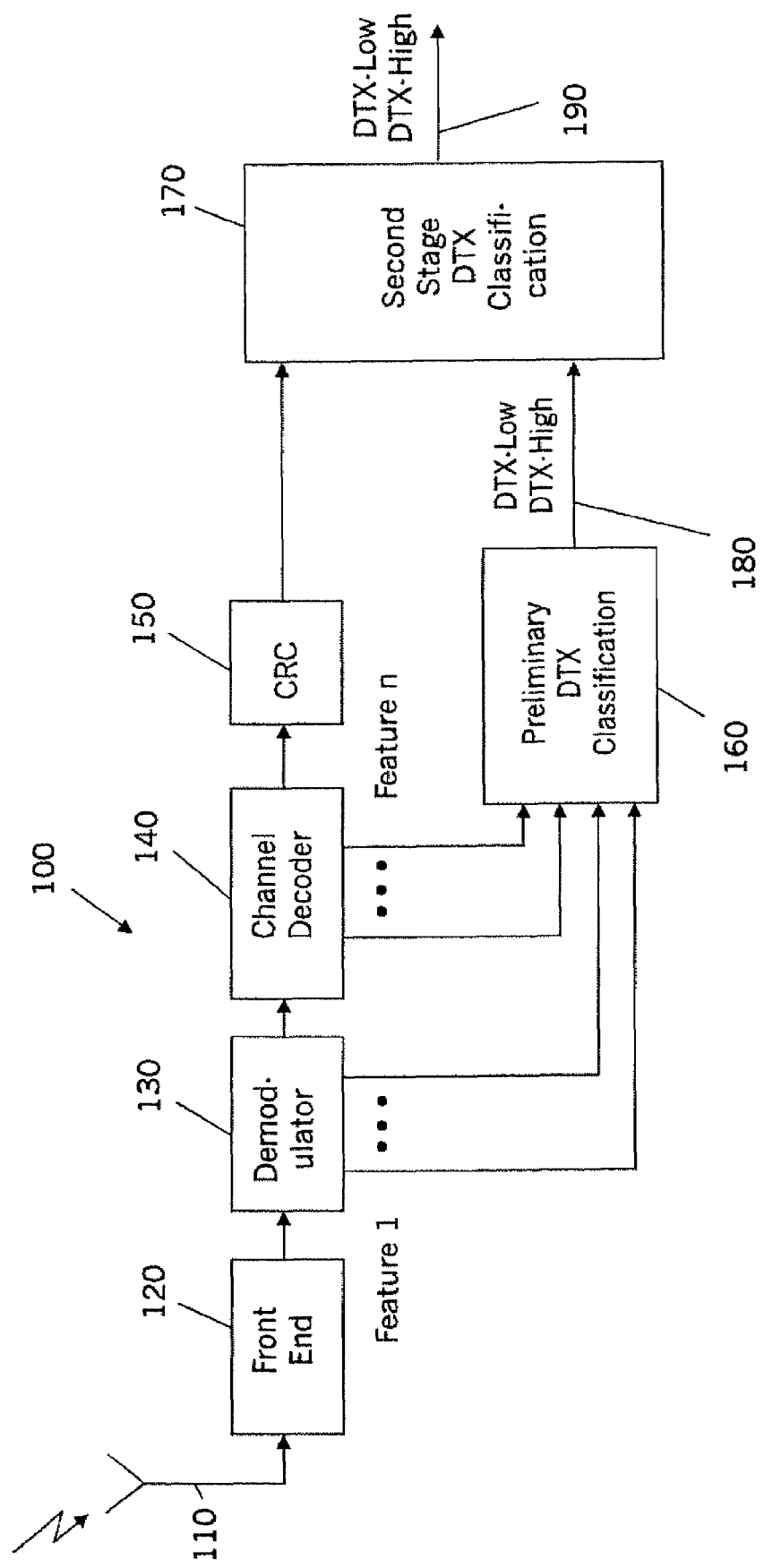

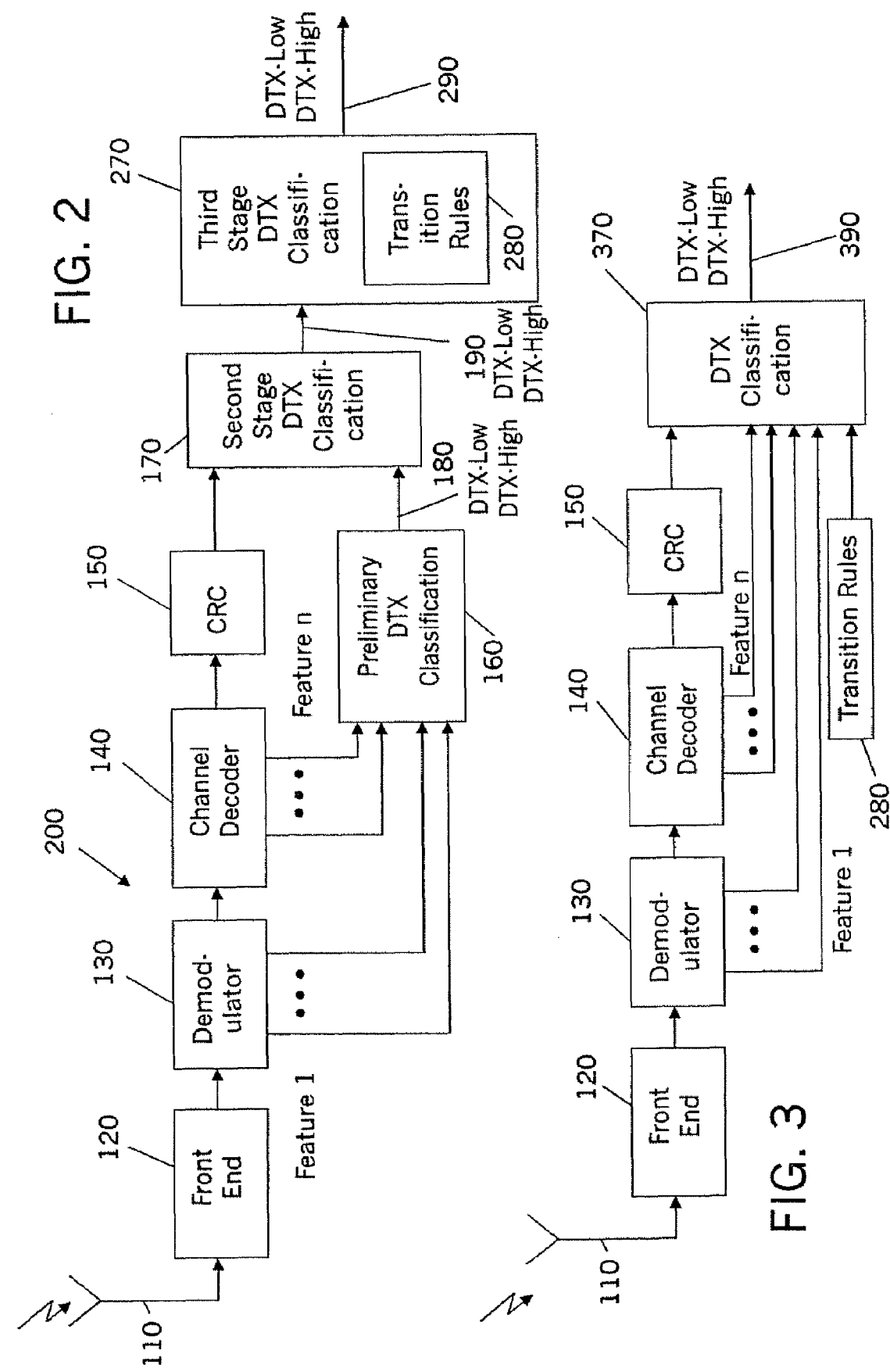

SYSTEMS AND METHODS FOR DETECTING DISCONTINUOUS TRANSMISSION (DTX) USING CYCLIC REDUNDANCY CHECK RESULTS TO MODIFY PRELIMINARY DTX CLASSIFICATION

CROSS REFERENCE TO RELATED APPLICATION

This application is a continuation of application Ser. No. 10/075,008, filed Feb. 13, 2002, now U.S. Pat. No. 7,061,099 entitled Systems and Methods for Detecting Discontinuous Transmission (DTX) Using Cyclic Redundancy Check Results to Modify Preliminary DTX Classification, assigned to the assignee of the present application, the disclosure of which is hereby incorporated herein by reference in its entirety as if set forth fully herein.

BACKGROUND OF THE INVENTION

The present invention relates to wireless communications, and more particularly to systems and methods for detecting discontinuous transmission in wireless communications.

Discontinuous transmission (DTX) is widely used in terrestrial and satellite cellular radiotelephone systems, including systems based on Time Division Multiple Access (TDMA), such as Global System for Mobile (GSM) communications and TIA/EIA-136, or Code Division Multiple Access (CDMA), such as IS-95. In particular, in conventional cellular radiotelephone communications systems, a wireless terminal may transmit continuously during a call. Normal conversation, however, may generally include pauses between periods of speech, such as when a user listens to the other party. When a wireless terminal user is not speaking, transmission of the radio signal may not be needed from an information point of view. With discontinuous transmission, pauses in normal speech are detected in order to suspend radio transmission for the duration of the pause. Discontinuous transmission can reduce air traffic, reduce interference between users, and/or extend battery life in wireless terminals. It will be understood that discontinuous transmission also may be used by a base station of a terrestrial network or a space-based component of a satellite network to wirelessly transmit to wireless terminals.

When using discontinuous transmission, a wireless transmitter may include a speech activity detector that detects whether or not a speech signal is present. During the periods during which no speech activity is detected, the transmitter may transmit nothing (as in a GSM system), or may transmit truncated bursts containing only radio control information (for example, 34 symbols versus 162 symbols, as in a TIA/EIA-136 system). The transmission of at least some truncated bursts may be desirable, to maintain a wireless connection between the wireless terminal and the base station serving it, and to transmit control information. In either case, the state in which truncated bursts are transmitted also is known as a DTX-Low or DTX-0 state, and the state in which normal, full-length bursts are transmitted also is known as a DTX-High or DTX-1 state.

Accordingly, it may be desirable for the wireless receiver to be able to distinguish between the DTX-High state and the DTX-Low state, in order to detect whether a normal burst or a truncated burst is present in a received information signal.

It is known to detect whether a normal burst or a truncated burst is present in a received information signal by using one or more features that are calculated during the processing (demodulating and/or decoding) of each received burst. For example, U.S. Pat. No. 6,097,772 to Johnson et al., entitled System and Method for Detecting Speech Transmissions in the Presence of Control Signaling, assigned to the assignee of the present invention, the disclosure of which is hereby incorporated herein by reference in its entirety as if set forth fully herein, describes the use of an estimated bit error rate to reduce the probability that control signals and other non-speech transmission segments are interpreted as speech and played. Also, U.S. Pat. No. 6,092,230 to Wood et al., entitled Method aid Apparatus for Detecting Bad Frames of Information in a Communication System, the disclosure of which is hereby incorporated herein by reference in its entirety as if set forth fully herein, describes the use of a Viterbi decoder metric to detect bad frames of information. Finally, U.S. patent application Ser. No. 10/002,722, filed Nov. 15, 2001, corresponding to U.S. Publication No. US 2003/0095507 A1, published May 22, 2003, entitled DTX Detection Method With High Success Probability, to the present inventor, et al., and assigned to the assignee of the present invention, the disclosure of which is hereby incorporated herein by reference in its entirety as if set forth fully herein, describes the use of the Euclidian distance between a soft bit representation of a reference field, and the received frame data bits corresponding to the position of the reference field in a truncated burst, to provide discontinuous transmission detection. However, the use of at least one feature that is calculated during the processing of each received burst may not provide adequate detection probability in high noise environments.

SUMMARY OF THE INVENTION

Some embodiments of the present invention can detect whether a normal burst or a truncated burst is present in a received information signal using cyclic redundancy check results and/or transition rules to modify a preliminary detection classification. In particular, in some embodiments of the invention, the received information signal is decoded to obtain the received information and to produce at least one feature of the received signal. The received signal is preliminarily classified as containing a normal burst or a truncated burst based upon the at least one feature, to obtain a preliminary classification. Cyclic redundancy checking of the received information that is decoded is performed. The received signal is then further classified as containing a normal burst or a truncated burst based upon the preliminary classification and whether the cyclic redundancy checking is valid, to obtain a further classification. According to some embodiments, the further classification can have a higher probability of correctly detecting whether a normal burst or a truncated burst is present in a received signal.

According to still other embodiments of the present invention, the received signal is still further classified as containing a normal burst or a truncated burst based upon the further classification and at least one transition rule for normal bursts and truncated bursts between the received signal and a previously received signal.

In some embodiments, the at least one feature comprises an estimated bit error rate, a Viterbi decoder metric and/or a distance measurement between a demodulated sub-sequence and a corresponding reference sequence. The demodulated sub-sequence is extracted from the demodulated data stream assuming that the received signal is a normal and a truncated burst, respectively. In other embodiments, the at least one transition rule for normal bursts and truncated bursts between the received signal and a previously received signal comprises a rule that truncated bursts can be received signal only after comfort noise parameters are received.

Still other embodiments can classify the received signal as containing a normal burst or a truncated burst based upon the at least one feature, the cyclic redundancy checking and/or transition rules, without the need to obtain a preliminary classification. It also will be understood that the invention may be embodied as methods, systems or components (mobile terminals, terrestrial base stations or space-based components).

BRIEF DESCRIPTION OF THE DRAWINGS

FIGS. 1-3 are block diagrams of systems, methods and/or components for detecting whether a normal burst or a truncated burst is present in a received signal, according to some embodiments of the invention.

DETAILED DESCRIPTION OF PREFERRED EMBODIMENTS

Figure 5:
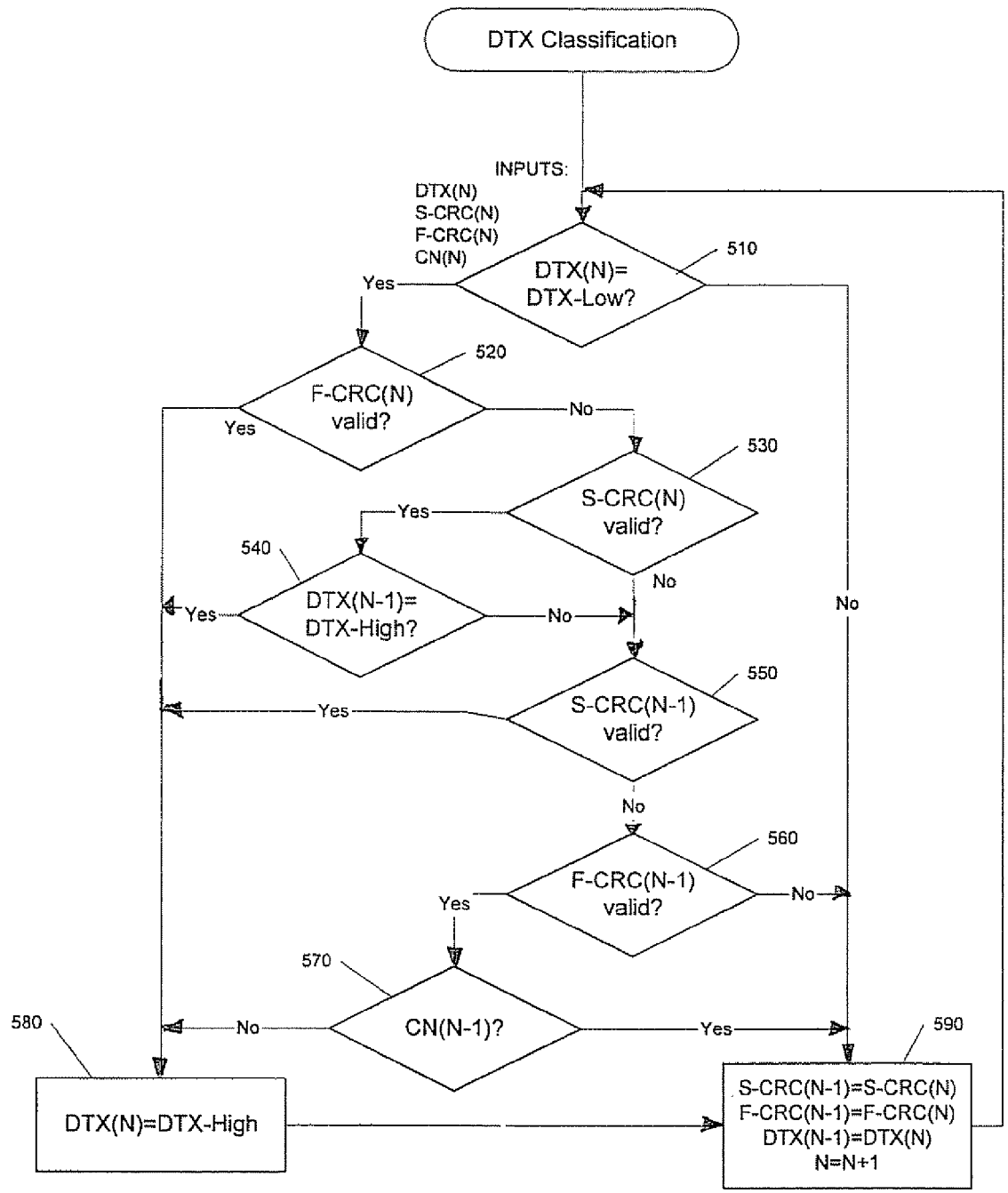
FIG. 5 is a flowchart illustrating operations that may be used to obtain DTX detection according to some embodiments of the invention.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Embodiments of the invention now will be described with reference to the TIA/EIA-136 standard, which is incorporated herein by reference. The TIA/EIA-136 standard is a TDMA standard for cellular and Personal Communications Services (PCS) networks. However, it will be understood that embodiments of the invention are not so limited, and may also be used in a cellular/PCS communication network based on CDMA, such as IS-95, CDMA 2000 and Wideband-CDMA (W-CDMA) and/or other wireless communications technologies and/or protocols, including terrestrial and satellite cellular systems.

Moreover, the invention may be embodied in a wireless receiver that may be included in a wireless terminal or in a base station. As used herein, the term "wireless terminal" may include, but is not limited to, a cellular wireless terminal with or without a multi-line display; a PCS terminal that may combine a cellular wireless terminal with data processing, facsimile and data communications capabilities; a Personal Digital Assistant (PDA) that can include a wireless terminal, pager, Internet/intranet access, Web browser, organizer, calendar and/or a Global Positioning System (GPS) receiver; and a conventional laptop and/or palmtop receiver or other appliance that includes a wireless terminal transceiver. Moreover, as used herein, the term "base station" may include any component of a wireless system infrastructure including cellular, microcell and picocell base stations, space-based components and land-based gateways.

Embodiments of the invention can be used by a wireless receiver to improve the quality of a digital radio speech connection using DTX by increasing the probability of correctly detecting the momentary transmitter state, i.e. whether the transmitter is transmitting speech (DITX-High) or operating in the power-saving mode (DTX-Low). As was described above, DTX can reduce the battery drain and/or interference at a wireless terminal, thereby increasing the total system capacity. A speech activity detector may detect whether or not a speech signal is present, thereby causing the wireless transmitter to operate either in the DTX-High or DTX-Low state.

During the DTX-high state when the speech transmission path is on, the transmitter transmits information-modulated radio signals using normal, full-length bursts. During the DTX-Low state, the speech transmission path is off and the transmitter either cuts off the transmission power completely (as in a GSM system) or alternatively transmits truncated bursts that are much shorter than a normal burst (34 symbols versus 162 symbols, as in a TIA/EIA-136 system). Embodiments of the invention now will be described based on a variant of the DTX protocol as specified in the TIA/EIA-136 standard which allows truncated bursts to be transmitted during the DTX-Low state. However, as was described above, embodiments of the invention can be used with other wireless communications systems as well.

A truncated burst generally includes at least some of the radio control information which is also included in a normal burst. This control information can include a Training Sequence, a Coded Digital Verification Color Code (CD-VCC) and a Slow Associated Control Channel (SACCH). The wireless receiver utilizes the Training Sequence and CDVCC in truncated bursts to maintain the radio connection during the DTX-Low state. The presence of SACCH in truncated bursts allows signaling information to be transmitted (for example the channel quality measurements by a wireless terminal), even after the transmitter has switched to the DTX-Low state.

While the transmitter autonomously switches between the DTX-High and the DTX-Low state, the receiver remains on during a call, continuously demodulating inputs at its antenna in a burst-by-burst fashion. Each demodulated burst may be treated as a normal burst, even though the burst can be a truncated burst, because the demodulator does not know the classification of the received burst at the time of demodulation. If a truncated burst has been received, a small part of the demodulated data is associated with the symbols transmitted in the truncated burst while the rest of the demodulated data may be random noise and/or interference.

After demodulation, a channel decoder perform is error-correction decoding and Cyclic Redundancy Code (CRC) checking. If the CRC is correct, the decoded frame is considered to be a speech frame and is forwarded to a speech decoder. If the CRC is invalid, the decoded data can be either a corrupted speech frame or mainly random noise if a truncated burst has been received.

To maintain the quality of a speech connection using DTX, it is generally desirable that a receiver include a DTX detection functionality that can reliably distinguish a normal burst from a truncated burst. In particular, it may be desirable for the speech decoder to know about the DTX-state to determine whether it should perform a bad frame masking procedure upon receiving a frame with a bad CRC, or generate synthetic noise (also referred to as comfort noise) upon receiving a truncated burst. Moreover, the CDVCC and SACCH have different locations depending on whether they are transmitted in a normal or a truncated burst. The receiver may only correctly extract the CDVCC and SACCH from the demodulated data if it can detect the DTX-state correctly. Finally, the demodulator may use some state variables to demodulate subsequent bursts. The state variable averages may be updated using the values calculated from a current burst. The updating values may depend on whether the demodulated burst is a normal or truncated burst. False DTX detection can therefore degrade the demodulator performance by using less accurate data to update the state variable averages.

Existing DTX-detection techniques may use one or more features calculated during the processing of each received burst. For example, the estimated bit error rate and/or the Viterbi decoder metric can be used to distinguish information-modulated signal from random noise.

Unfortunately, it may be difficult to achieve high reliability of DTX detection in a harsh radio environment with fading and time dispersion. In particular, under extreme channel conditions, for example a long fading dip, a received normal burst may have a bit error rate of approximately 50% which may make it undistinguishable from a truncated burst.

On a digital radio speech connection, the audio signal may be digitized and compressed using a speech-coding algorithm to produce a number of quantized speech parameters, in a frame-by-frame fashion. Each speech frame is thereafter protected by addition of channel coding redundancy. First, a CRC may be calculated over the perceptually most important speech bits. Then, a subset of the speech bits including the CRC may be encoded with an error-correction code such as a convolutional code. All speech bits, including both error-protected and non-protected bits, are interleaved over two consecutive bursts of the timeslot being assigned to the call. Every burst will therefore contain bits from two consecutive speech frames. Stated differently, half of the speech bits in a burst originate from the current speech frame and the other half of the speech bits from a preceding speech frame.

During a speech connection, some signaling information may need to be transmitted in which case the FACCH is transmitted in place of speech. Since signaling information may not tolerate any bit errors, a FACCH signaling message may be error protected with much more redundancy than a speech frame to correct and detect more error patterns. Like an encoded speech frame, an encoded FACCH message is also interleaved over two consecutive bursts.

FIG. 1 is a block diagram of systems, methods and/or components 100 for detecting whether a normal burst or a truncated burst is present in a received signal, according to some embodiments of the invention. These embodiments may form part of a receiver, which may be included in a wireless terminal and/or a base station.

Referring now to FIG. 1, an antenna 110 may be used to receive radiotelephone communications and a front end 120, including splitters, amplifiers, filters and/or other radio frequency components, may be used to condition the received signal. A demodulator 130 demodulates the signal. The demodulator 130 may include a Maximum Likelihood Sequence Estimator (MLSE) equalizer to counter possible time dispersion. The demodulated data is passed to a channel decoder 140 where it is de-interleaved and error-correction decoded to recover the original information. The CRC is then checked at CRC block 150 to determine whether or not the decoded information is intact. Due to interleaving over two consecutive bursts, the channel decoder 140 combines half of the de-interleaved speech data from the previous burst and half of the de-interleaved speech data from the current burst to decode an information signal.

When performing channel decoding, the receiver generally does not know whether the demodulated data is associated with a speech or a FACCH frame, since a FACCH frame can be sent in place of a speech frame at any time. Accordingly, the channel decoder 140 may first decode the demodulated data as a FACCH frame and then check the FACCH CRC. If the FACCH CRC is valid, then decoded data is interpreted as a FACCH frame and forwarded to a base station controller (BSC) (not shown). If the FACCH CRC fails, the receiver decodes the same demodulated data as a speech frame. The decoded data together with the CRC status is forwarded to a speech decoder (not shown). The speech decoder acts upon each received frame by performing normal speech decoding or a bad frame masking procedure depending on whether or not the speech CRC is correct.

When using DTX, the radio transmitter autonomously switches between the two DTX states. When the speech transmission path is cut off during the DTX-Low state, the background acoustic noise also disappears which may be annoying to the listener, especially with frequent DTX switching. Therefore, the transmitter may estimate comfort noise parameters and transmit them to the receiver before transitioning to the DTX-Low state, and thereafter at a defined rate. The comfort noise parameters may be used by the receiver to generate synthetic noise which is similar to the transmitter-side background noise. The comfort noise parameters are encoded as a FACCH frame and transmitted in two consecutive normal bursts. After sending the comfort noise parameters, the transmitter starts sending truncated bursts. The design and operation of the antenna 110, front end 120, demodulator 130, channel decoder 140 and CRC block 150 are well known to those having skill in the art and need not be described further herein.

Continuing with the description of FIG. 1, it is known that the demodulator 130 and/or the channel decoder 140 may produce features which generally are analog metrics of the quality or type of signal that is received, and which may be used to distinguish an information-modulated signal from random noise. These metrics may include, but are not limited to, an estimated bit error rate, a Viterbi decoder metric and a distance measurement between a demodulated sub-sequence and a corresponding reference sequence. The generation of these features, feature 1-feature n, by the demodulator 130 and/or the channel decoder 140 are well known to those having skill in the art and need not be described further herein.

As shown in FIG. 1, according to some embodiments of the invention, one or more of these features, feature 1-feature n, may be used to provide a preliminary DTX classification 180 at a Preliminary DTX classification block 160, to preliminarily classify the received signal as containing a normal burst (DTX-High or DTX-1), or a truncated burst (DITX-Low or DTX-0), to thereby obtain a preliminary classification 180 based upon the at least one feature. Preliminary DITX classification 160 may use one or more of the techniques that were described in the above-incorporated U.S. Pat. Nos. 6,097, 772, 6,092,230 and or application Ser. No. 10/002,722.

Still continuing with the description of FIG. 1, a second stage DTX classification block 170 further classifies the received signal as containing a normal burst or a truncated burst based upon the preliminary classification 180 and whether the cyclic redundancy checking 150 is valid, to obtain a farther classification 190. As will be described below, the further classification 190 may be more accurate than the preliminary classification 180 that is obtained based on demodulator and/or decoder features.

FIG. 2 is a block diagram of other embodiments according to the invention. In these embodiments 200, a third stage DTX classification block 270 provides still further classification 290 based on at least one transition rule 280 for normal bursts and truncated bursts between the received information signal and a previously received information signal, to obtain a still further classification 290 of the received information signal as containing a normal burst or a truncated burst. An example of a transition rule is a rule that a truncated burst can be included in a transmitted information signal only after comfort noise parameters are transmitted in a previously received information signal. It will be understood that the classification 290 may be further classified if desired. Alternatively, the third stage DTX classification block 290 can provide the final classification upon which a determination is made as to whether a normal or a truncated burst was received.

It also will be understood that the preliminary, second and third stage DTX classifications need not be performed sequentially, as illustrated in FIGS. 1 and 2. Rather, as shown in FIG. 3, a single DTX classification block 370 may be responsive to the features, feature 1-feature n, the CRC 150 and/or the transition rules 280, to classify the received burst as a normal burst or a truncated burst.

Some embodiments of the invention can significantly enhance the reliability of DTX detection because they need not solely rely on the detection features. Rather, some embodiments of the invention can combine the features with the CRC status of the decoded frames and/or the knowledge about the DTX protocol as embodied in transition rules. A false DTX detection may only occur if both the features and the CRC status/transition rule status fail to distinguish the two types of signals.

Figure 4:
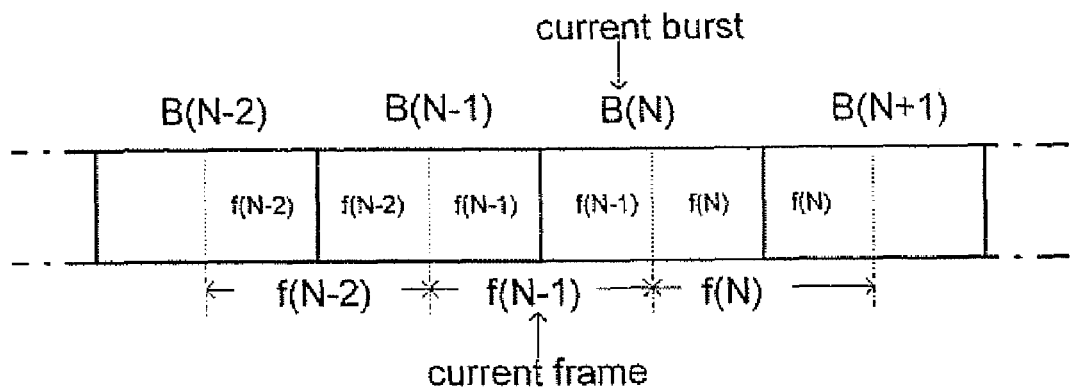
FIG. 4 illustrates burst demodulation and frame decoding according to some embodiments of the invention.

FIG. 4 depicts four consecutive bursts B(N−2), B(N−1), B(N) and B(N+1) where B(N) is the current burst. Each burst contains bits from two successive information frames, and each information frame can be a speech, a FACCH or an empty frame. The term empty frame is used because when a truncated burst is received, the decoded frame can essentially be random noise and interference. As shown in FIG. 4, after demodulating the current burst, B(N), the frame f(N−1) can be decoded and its CRC status determined.

During DTX detection, the receiver determines whether each received burst B(N) is a normal or a truncated burst. According to some embodiments of the invention, the receiver calculates the values of the selected features during the processing of each received burst to make a preliminary decision on the current DTX-state. In some embodiments, the selected features should have a fairly high probability of correctly detecting the DTX-state when the channel condition is not too severe. Under extreme channel conditions, these features can lead to a false detection which can be corrected by utilizing the CRC status of the most recent two decoded frames, i.e. f(N−2) and f(N−1), as described below.

There are two types of false detection. In type-I, DTX-High is detected as DTX-Low, i.e., a normal burst is misinterpreted as a truncated burst. In type-I, DTX-Low is detected as DTX-High, i.e., a truncated burst is misinterpreted as a normal burst.

Some embodiments of the invention can use the CRC status of the two most recent frames to correct the type-I false detection. While not wishing to be bound by any theory of operation, simulations have shown that more than 95% of the false detections belong to type-I, and correcting the type-I false detection can significantly improve the overall DTX detection performance. Moreover, the CRC status may not be suitable for correcting the type-II false correction, since even if both of the two most recent frames have a bad CRC, the current burst may still likely be a normal burst.

According to some embodiments of the invention, the DTX-state may be detected by calculating the values of DTX detection features (feature 1-feature n) during the processing of a received burst by the demodulator 130 and/or decoder 140, to make a preliminary decision (Block 160) on the current DTX-state, DTX(N). DTX(N) may be forwarded to the channel decoder 140. The channel decoder 140 decodes the current frame f(N−1) and performs the CRC check 150 to obtain the following CRC status information of the frame: the speech CRC status S-CRC(N) (Valid or Invalid), the FACCH CRC status F-CRC(N) (Valid or Invalid) and whether or not the FACCH frame contains comfort noise parameters CNN) (Yes or No).

FIG. 5 is a flowchart of operations that may be used to obtain DTX detection according to some embodiments of the invention. As will be described below, these embodiments can employ the second stage DTX classification 170 of FIG. 1 or 2, the third stage DTX classification 270 of FIG. 2 or the combined DTX classification 370 of FIG. 3. As will be appreciated by one of skill in the art, some embodiments of the present invention may take the form of an entirely hardware embodiment, an entirely software embodiment or an embodiment combining software and hardware aspects. Accordingly, blocks of the flowchart support combinations of means for performing the specified functions, combinations of steps for performing the specified functions and program instruction means for performing the specified functions.

Referring now to FIG. 5, at Block 510, a test is made as to whether the preliminary classification, based on features of the current frame DTX(N), indicates a DTX-Low. If not, indicating DTX-High, then this preliminary DTX classification is accepted without any second or third stage classification, and the results are stored at Block 590. If the preliminary DTX classification indicates DTX-High at Block 510, this classification may be accepted because the results of the CRC computation 150 may not be used to override the preliminary DTX-High classification, since an invalid CRC may not be unusual. Thus, the preliminary DTX-High classification is accepted.

Still referring to FIG. 5 at Block 510, if DTX(N) is DTX-Low, then at Block 520, the second stage classification 170 or the DTX classification 370 checks the CRC status of the current frame. If the FACCH CRC is valid at Block 520, then DTX(N) is changed to DTX-High at Block 580. Thus, at Block 520, the second stage classification 170 or the DTX classification 370 changes the preliminary DTX classification based on the CRC being valid. This change may be made because, if the FACCH CRC is valid, this may provide a very strong implication of a normal burst, due to the reliability of the FACCH CRC, notwithstanding the preliminary DTX classification of DTX-Low.

Referring again to Block 520, if the FACCH CRC is not valid, a test is made at Block 530 if the speech CRC(S-CRC) is valid. If the speech CRC is valid at Block 530, DTX(N) is only changed to DTX-High when the DTX state of the previous burst DTX(N−1) is DTX-High at Block 540. The additional check of DTX(N−1) at Block 540 may be performed, since the speech CRC has only seven bits, which may provide limited error correction capacity, and there is a small probability that a truncated burst passes the CRC check. By also checking DTX(N−1), a false correction of DTX(N) only occurs when DTX(N−1) is wrong and, at the same time, a truncated burst passes the speech CRC check. Thus, false corrections may be extremely unlikely.

If both the FACCH (Block 520) and the speech CRC (Block 530) of the current frame are invalid, the operations further check the CRC status of the previous frame. If the speech CRC of the previous frame is correct (Block 550), the DTX(N) is changed to DTX-High. DTX(N) is also changed to DTX-High if the FACCH CRC of the previous frame is valid (Block 560) and the FACCH frame does not contain comfort noise parameters (Block 550). The CRC status of the previous frame (Blocks 550 and 560) can be used to detect the current DTX-state due to the DTX protocol (transition rules) which states that the transmitter can only start transmitting truncated bursts after it has sent comfort noise parameters.

Figure 6:
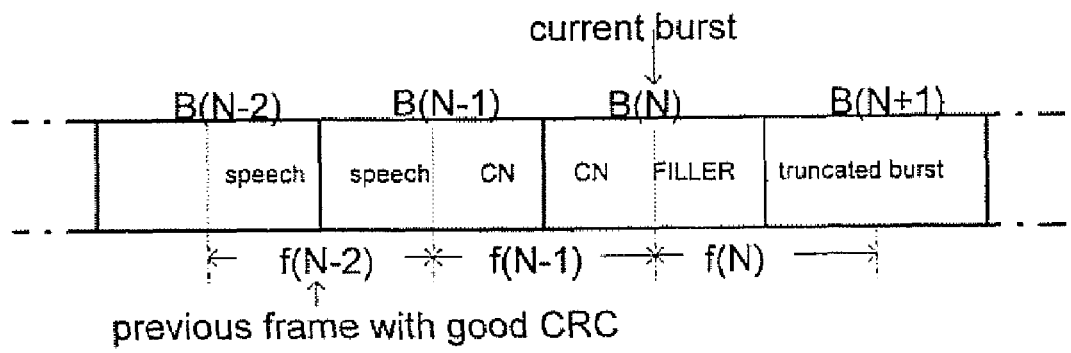
FIGS. 6-7 illustrate use of transition rules in DTX detection according to some embodiments of the invention.

Thus, if the previous burst is a normal burst, as indicated by the valid speech CRC of the previous frame, then, according to the DTX protocol (transition rules), the transmitter can only start sending truncated bursts after it has completely sent out the comfort noise parameters in the previous burst. See FIG. 6. Thus, Blocks 550, 560 and 570 illustrate another application of transition rules 280 for a third stage DTX classification 270 or a DTX classification 370, according to some embodiments of the invention.

Figure 7:
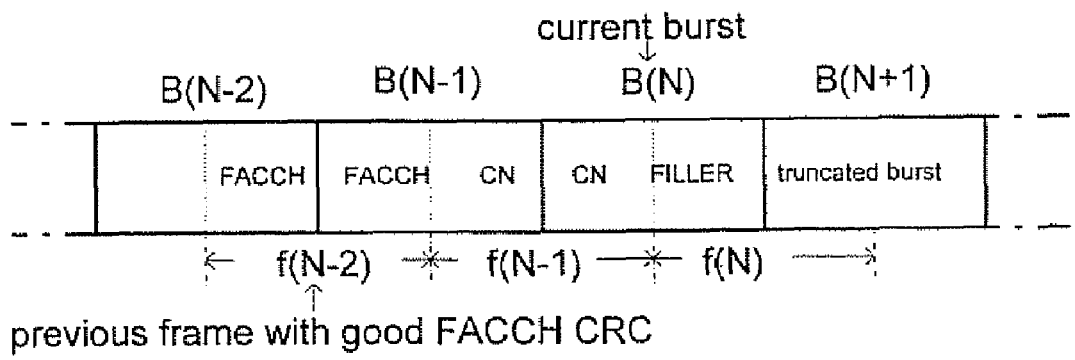

FIG. 7 shows another example of application of transition rules. In particular, if the FACCH CRC of the previous frame is valid (Block 560) and the FACCH frame does not contain comfort noise parameters (Block 570), then the current burst must be a normal burst according to the DTX-Protocol. The next burst B(N+1) can, however, be a truncated burst.

As was described above, some embodiments of the invention can perform further classification based upon the cyclic redundancy checking and/or the transition rules of the DTX protocol, to allow improved performance compared to conventional single stage feature classification. In particular, let $p_0$ be the probability of successful DTX detection using only detection features (feature 1-feature n), let r be the percentage of the type-I false detection, then the probability of a type-I false detection is equal to $(1-p_0)r$. A type-I false detection can be corrected if at least one of the two most recent frames has a valid CRC which has a probability $1-FER^2$ where FER is the frame erasure rate. The probability of a correctable type-I false detection is equal to:

$$p_1 = r(1-p_0)(1-FER^2).$$

On the other hand, if the transmitter has actually transmitted a truncated burst and the feature-based detection is correct, i.e., DTX(N) is DTX-Low, then there exists a probability that the channel decoder wrongly changes the DTX-state from DTX-Low to DTX-High. However, this wrong correction can only occur when random noise passes the speech CRC check and at the same time the DTX detection for the previous burst was wrong, the radio receiver detected DTX-High upon receiving a truncated burst. The wrong correction probability is given by:

$$p_2 = 1/2^{n-k}(1-r)(1-p_0),$$

where n−k is the speech CRC length which is equal to 7. Assume that the feature-based DTX has a success probability $p_0$ equal to 98.5%, r is equal to 97% and FER=10%, then, by using some embodiments of the invention, the successful DTX detection probability is $$p = p_0 + p_1 - p_2 = 99.92\%,$$

which is a significant improvement from 98.5%.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of detecting whether a normal burst or a truncated burst is present in a received information signal that is received at a wireless component, the method comprising the following that are performed by the wireless component:
    decoding the received information signal to obtain the received information and to produce at least one feature of the received information signal;
    preliminarily classifying the received information signal as containing a normal burst or a truncated burst based upon the at least one feature, to obtain a preliminary classification;
    cyclic redundancy checking the received information that is decoded; and
    further classifying the received information signal as containing a normal burst or a truncated burst based upon the preliminary classification and whether the cyclic redundancy checking is valid, to obtain a further classification.

2. A method according to claim 1 wherein the further classifying is followed by:
    still further classifying the received information signal as containing a normal burst or a truncated burst based upon the further classification and at least one transition rule for normal bursts and truncated bursts between the received information signal and a previously received information signal.

3. A method according to claim 1:
    wherein the cyclic redundancy checking comprises cyclic redundancy checking the received information that is decoded and previously received information that is decoded; and
    wherein the further classifying comprises further classifying the received information signal as containing a normal burst or a truncated burst based upon the preliminary classification and whether the cyclic redundancy checking of the received information that is decoded and the previously received information that is decoded are valid, to obtain a further classification.

4. A method according to claim 3 wherein the further classifying is followed by:
    still further classifying the received information signal as containing a normal burst or a truncated burst based upon the further classification and at least one transition rule for normal bursts and truncated bursts between the received information signal and the previously received information signal.

5. A method according to claim 1 wherein the at least one feature comprises an estimated bit error rate, a Viterbi decoder metric and/or a distance measurement between a demodulated sub-sequence and a corresponding reference sequence.

6. A method according to claim 1:
    wherein the preliminarily classifying comprises preliminarily classifying the received information signal as containing truncated burst based upon the at least one feature, to obtain a preliminary classification as a truncated burst; and
    wherein the further classifying comprises further classifying the received information signal as containing a normal burst based upon the preliminary classification as a truncated burst upon the cyclic redundancy checking being valid, to obtain a further classification as a normal burst.

7. A method of detecting whether a normal burst or a truncated burst is present in a received information signal that is received at a wireless component, the method comprising the following that are performed by the wireless component:
    decoding the received information signal to obtain the received information and to produce at least one feature of the received information signal;
    cyclic redundancy checking the received information that is decoded; and
    classifying the received information signal as containing a normal burst or a truncated burst based upon the at least one feature of the received information signal and the cyclic redundancy checking.

8. A method according to claim 7 wherein the classifying comprises:
classifying the received information signal as containing a normal burst or a truncated burst based upon the at least one feature of the received information signal, the cyclic redundancy checking and at least one transition rule for normal bursts and truncated bursts between the received information signal and a previously received information signal.

9. A system for detecting whether a normal burst or a truncated burst is present in a received information signal, the system comprising:
a decoder that is configured to decode the received information signal to obtain the received information and to produce at least one feature of the received information signal;
a preliminary classifier that is configured to preliminarily classify the received information signal as containing a normal burst or a truncated burst based upon the at least one feature, to obtain a preliminary classification;
a cyclic redundancy checker that is configured to cyclic redundancy check the received information that is decoded; and
a second stage classifier that is configured to further classify the received information signal as containing a normal burst or a truncated burst based upon the preliminary classification and whether the cyclic redundancy checking is valid, to obtain a further classification.

10. A system according to claim 9 further comprising:
a third stage classifier that is configured to still further classify the received information signal as containing a normal burst or a truncated burst based upon the further classification and at least one transition rule for normal bursts and truncated bursts between the received information signal and a previously received information signal.

11. A system according to claim 9:
wherein the cyclic redundancy checker is further configured to cyclic redundancy check the received information that is decoded and previously received information that is decoded; and
wherein the second stage classifier is further configured to classify the received information signal as containing a normal burst or a truncated burst based upon the preliminary classification and whether the cyclic redundancy checking of the received information that is decoded and the previously received information that is decoded are valid, to obtain a further classification.

12. A system according to claim 11 further comprising:
a third stage classifier that is configured to still further classify the received information signal as containing a normal burst or a truncated burst based upon the further classification and at least one transition rule for normal bursts and truncated bursts between the received information signal and the previously received information signal.

13. A system according to claim 9 wherein the at least one feature comprises an estimated bit error rate, a Viterbi decoder metric and/or a distance measurement between a demodulated sub-sequence and a corresponding reference sequence.

14. A system according to claim 9:
wherein the preliminarily classifier is further configured to preliminarily classify the received information signal as containing truncated burst based upon the at least one feature, to obtain a preliminary classification as a truncated burst; and
wherein the second stage classifier is further configured to classify the received information signal as containing a normal burst based upon the preliminary classification as a truncated burst upon the cyclic redundancy checking being valid, to obtain a further classification as a normal burst.

15. A system for detecting whether a normal burst or a truncated burst is present in a received information signal, the system comprising:
a decoder that is configured to decode the received information signal to obtain the received information and to produce at least one feature of the received information signal;
a cyclic redundancy checker that is configured to cyclic redundancy check the received information that is decoded; and
a classifier that is configured to classify the received information signal as containing a normal burst or a truncated burst based upon the at least one feature of the received information signal and the cyclic redundancy checking.

16. A system according to claim 15 wherein the classifier is further configured to classify the received information signal as containing a normal burst or a truncated burst based upon the at least one feature of the received information signal, the cyclic redundancy checking and at least one transition rule for normal bursts and truncated bursts between the received information signal and a previously received information signal.

17. A wireless component comprising:
a wireless receiver that is configured to receive an information signal containing a normal burst or a truncated burst;
a decoder that is configured to decode the received information signal to obtain the received information and to produce at least one feature of the received information signal;
a preliminary classifier that is configured to preliminarily classify the received information signal as containing a normal burst or a truncated burst based upon the at least one feature, to obtain a preliminary classification;
a cyclic redundancy checker that is configured to cyclic redundancy check the received information that is decoded; and
a second stage classifier that is configured to further classify the received information signal as containing a normal burst or a truncated burst based upon the preliminary classification and whether the cyclic redundancy checking is valid, to obtain a further classification.

18. A wireless component according to claim 17 further comprising:
a third stage classifier that is configured to still further classify the received information signal as containing a normal burst or a truncated burst based upon the further classification and at least one transition rule for normal bursts and truncated bursts between the received information signal and a previously received information signal.

19. A wireless component according to claim 17:
wherein the cyclic redundancy checker is further configured to cyclic redundancy check the received information that is decoded and previously received information that is decoded; and
wherein the second stage classifier is further configured to classify the received information signal as containing a normal burst or a truncated burst based upon the preliminary classification and whether the cyclic redundancy checking of the received information that is decoded and the previously received information that is decoded are valid, to obtain a further classification.

20. A wireless component according to claim 19 further comprising:
a third stage classifier that is configured to still further classify the received information signal as containing a normal burst or a truncated burst based upon the further classification and at least one transition rule for normal bursts and truncated bursts between the received information signal and the previously received information signal.

21. A wireless component according to claim 17 wherein the at least one feature comprises an estimated bit error rate, a Viterbi decoder metric and/or a distance measurement between a demodulated sub-sequence and a corresponding reference sequence.

22. A wireless component according to claim 17:
wherein the preliminarily classifier is further configured to preliminarily classify the received information signal as containing truncated burst based upon the at least one feature, to obtain a preliminary classification as a truncated burst; and
wherein the second stage classifier is further configured to classify the received information signal as containing a normal burst based upon the preliminary classification as a truncated burst upon the cyclic redundancy checking being valid, to obtain a further classification as a normal burst.

23. A wireless component comprising:
a wireless receiver that is configured to receive an information signal containing a normal burst or a truncated burst;
a decoder that is configured to decode the received information signal to obtain the received information and to produce at least one feature of the received information signal;
a cyclic redundancy checker that is configured to cyclic redundancy check the received information that is decoded; and
a classifier that is configured to classify the received information signal as containing a normal burst or a truncated burst based upon the at least one feature of the received information signal and the cyclic redundancy checking.

24. A wireless component according to claim 23 wherein the classifier is further configured to classify the received information signal as containing a normal burst or a truncated burst based upon the at least one feature of the received information signal, the cyclic redundancy checking and at least one transition rule for normal bursts and truncated bursts between the received information signal and a previously received information signal.

* * * * *

UNITED STATES PATENT AND TRADEMARK OFFICE
CERTIFICATE OF CORRECTION

PATENT NO.        : 7,616,712 B2                                        Page 1 of 1
APPLICATION NO. : 11/381040
DATED             : November 10, 2009
INVENTOR(S)       : Chen It is certified that error appears in the above-identified patent and that said Letters Patent is hereby corrected as shown below:

In Column 2, Line 10, delete "aid" and insert -- and --, therefor.

In Column 4, Line 1, delete "(DITX-High)" and insert -- (DTX-High) --, therefor.

In Column 4, Line 44, delete "perform is" and insert -- performs --, therefor.

In Column 6, Line 43, delete "(DITX-Low" and insert -- (DTX-Low --, therefor.

In Column 6, Line 45, delete "DITX" and insert -- DTX --, therefor.

In Column 6, Line 54, delete "farther" and insert -- further --, therefor.

In Column 7, Line 46, delete "type-I," and insert -- type-II, --, therefor.

In Column 8, Line 3, delete "CNN)" and insert -- CN(N) --, therefor.

In Column 9, Line 26, delete "I-FER$^2$" and insert -- 1-FER$^2$ --, therefor.

In Column 9, Line 49, in Equation, delete "$p=p_0+p_1-p=99.92\%$," and insert -- $p = p_0 + p_1 - p_2 = 99.92\%$, --, therefor.

Signed and Sealed this

Sixteenth Day of March, 2010

David J. Kappos
*Director of the United States Patent and Trademark Office*